United States Patent
Frank

(10) Patent No.: US 8,447,902 B2
(45) Date of Patent: May 21, 2013

(54) METHOD AND APPARATUS FOR PREDICTIVE SWITCHING

(75) Inventor: Ingolf Frank, Oberding (DE)

(73) Assignee: Integrated Device Technology, Inc., San Jose, CA (US)

( * ) Notice: Subject to any disclaimer, the term of this patent is extended or adjusted under 35 U.S.C. 154(b) by 2212 days.

(21) Appl. No.: 11/198,512

(22) Filed: Aug. 5, 2005

(65) Prior Publication Data

US 2007/0030938 A1    Feb. 8, 2007

(51) Int. Cl.
*G06F 3/00* (2006.01)
*G06F 5/00* (2006.01)

(52) U.S. Cl.
USPC .......................................................... 710/58

(58) Field of Classification Search ............... 710/58, 710/59; 713/401
See application file for complete search history.

(56) References Cited

U.S. PATENT DOCUMENTS

| | | | |
|---|---|---|---|
| 4,639,853 A | | 1/1987 | Rake et al. |
| 4,694,441 A * | | 9/1987 | Tomisawa et al. ......... 369/30.25 |
| 4,717,912 A * | | 1/1988 | Harvey et al. .................. 326/46 |
| 5,497,263 A * | | 3/1996 | Masuda et al. ................. 327/278 |
| 6,140,848 A * | | 10/2000 | Harvey .......................... 327/112 |
| 6,378,079 B1 * | | 4/2002 | Mullarkey ...................... 713/401 |
| 6,385,108 B2 * | | 5/2002 | Morzano ........................ 365/207 |
| 6,621,882 B2 * | | 9/2003 | Denny et al. .................. 375/371 |
| 6,629,250 B2 * | | 9/2003 | Kopser et al. ................. 713/401 |
| 6,697,926 B2 * | | 2/2004 | Johnson et al. ............... 711/167 |
| 6,963,989 B1 * | | 11/2005 | Cullum et al. ................. 713/401 |
| 7,319,728 B2 * | | 1/2008 | Bell et al. ...................... 375/354 |
| 2005/0110548 A1 * | | 5/2005 | Suda et al. .................... 327/277 |

OTHER PUBLICATIONS

High-Efficiency Predictive Synchronous Buck Driver. UCC27222/UCC27221 datasheet [onine]. Texas Instruments, 2003 [retrieved on Apr. 21, 2007), Retrieved from the internet: <URL: http://www.ti.com/lit/gpn/ucc27222>, Fig. 1-3, p. 1-7.

Martinez, J . Piecewise Linear Simulation of Optoelectrical devices with application to MEMS. thesis [online]. 2000 [retrieved on Apr. 21, 2007]. Retrieved from the Internet: <URL: http://kona.ee.pitt.edu/jmarti/papers/MS_Thesis_07_10_00.pdf>.

* cited by examiner

*Primary Examiner* — Elias Mamo
(74) *Attorney, Agent, or Firm* — Heimlich Law, PC; Alan Heimlich, Esq.

(57) ABSTRACT

A method and apparatus for predictive switching an output have been disclosed.

7 Claims, 8 Drawing Sheets

METHOD AND APPARATUS FOR PREDICTIVE SWITCHING

FIELD OF THE INVENTION

The present invention pertains to predictive switching. More particularly, the present invention relates to a method and apparatus for predictive switching an output.

BACKGROUND OF THE INVENTION

Outputs in the form of output buffers are an integral part of electronics. Their use is wide and diverse. They are used to drive a variety of other devices both active and passive, for example, logic, microprocessors, bus clocks, resistors, capacitors, backplanes, etc. When driving such a variety of devices and depending upon the load presented to the output buffer and the speeds required for output transitions it is possible that the output may be too slow thus slowing down an entire system. For example the output transition of a memory may slow down the entire system. This presents a problem.

Additionally, drivers have finite output drive capability to drive loads. If a driver has a heavy load then it may take a longer time than needed to drive the load to a required level. This presents a problem.

Registers for DIMMs (Dual In-line Memory Modules) receive a clock signal and use this to determine the point in time to store the input signal level which is then used to drive the output to this level. This results in a delay between the clock edge and output swing. This may present a problem.

BRIEF DESCRIPTION OF THE DRAWINGS

The invention is illustrated by way of example and not limitation in the figures of the accompanying drawings in which.

DETAILED DESCRIPTION

The invention, as exemplified in various embodiments, illustrates predictive switching. In one embodiment of the invention, predictive switching is used to allow an output signal more time to reach a given output level. That is, one embodiment of the invention allows the use of slower rise and fall times which may result in better signal integrity in an application, reduce current drain, lower electronic emissions, etc. In one embodiment of the invention, predictive switching is used to decrease the delay to output timing. One embodiment of the invention may be used to reduce the delay between a clock edge and the resulting output signal change thus allowing operation at higher speed.

Figure 3:
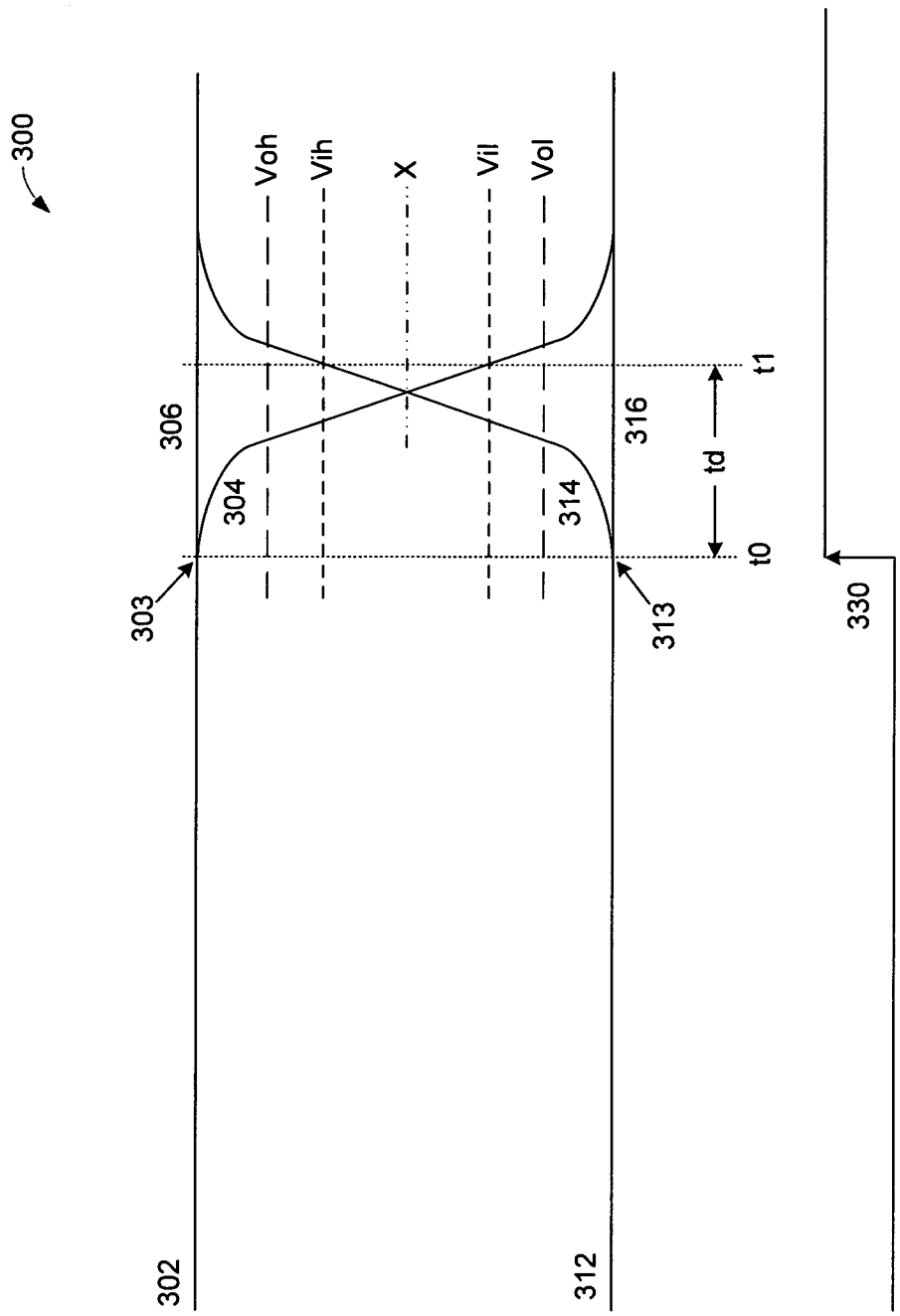
FIG. 3 illustrates a clock and a switching output which will be used to illustrate embodiments of the invention.

FIG. 3 illustrates at 300 a clock and a switching output which will be used to illustrate embodiments of the invention. The clock is illustrated at 330, and the device switching at 302 through 316. Also shown are logic threshold and output levels and some timing delays. Voh and Vol represent the device's output high voltage and output low voltage respectively. Vih and Vil represent the input high and low threshold voltage respectively for a device receiving the device output. For illustration purposes only, so as not to obscure the invention, FIG. 3 has an instantaneously rising clock 330, and output switching is symmetrical (i.e. X denotes the mid cross-over point).

The clock 330, on its rising edge at time t0 causes a device to drive and possibly switch its output logic state. The device, for discussion sake, has a logic high output denoted at 302, or a logic low output denoted at 312.

At t0 the device, if previously in a logic high state 302, at 303 may either remain at logic high 306, or transition 304 to a logic low 316. A device receiving this output must wait till the output crosses Vil at t1 (i.e. a delay of td) in order to know for certain which state (high or low) the output is in.

At t0 the device, if previously in a logic low state 312, at 313 may either remain at logic low 316, or transition 314 to a logic high 306. A device receiving this output must wait till the output crosses Voh at t1 (i.e. a delay of td) in order to know for certain which state (high or low) the output is in.

While a device may be guaranteed to output a Voh or Vol level, the earliest that a device receiving this output can respond is the input threshold level (Vih or Vil).

The clock signal 330 represents the earliest time that a device such as a register clock input knows for certain that a signal is in a proper final state and that the output may be switched to reflect this. Thus, after the clock is asserted the output begins to switch to the correct state or stays in the correct state if no switching is needed.

In one embodiment of the invention, the output begins switching before the correct output state is determined, i.e. predictive or a priori switching.

To illustrate the range of applicability of the present invention, limit cases will be discussed and then an optimum case.

Figure 4:
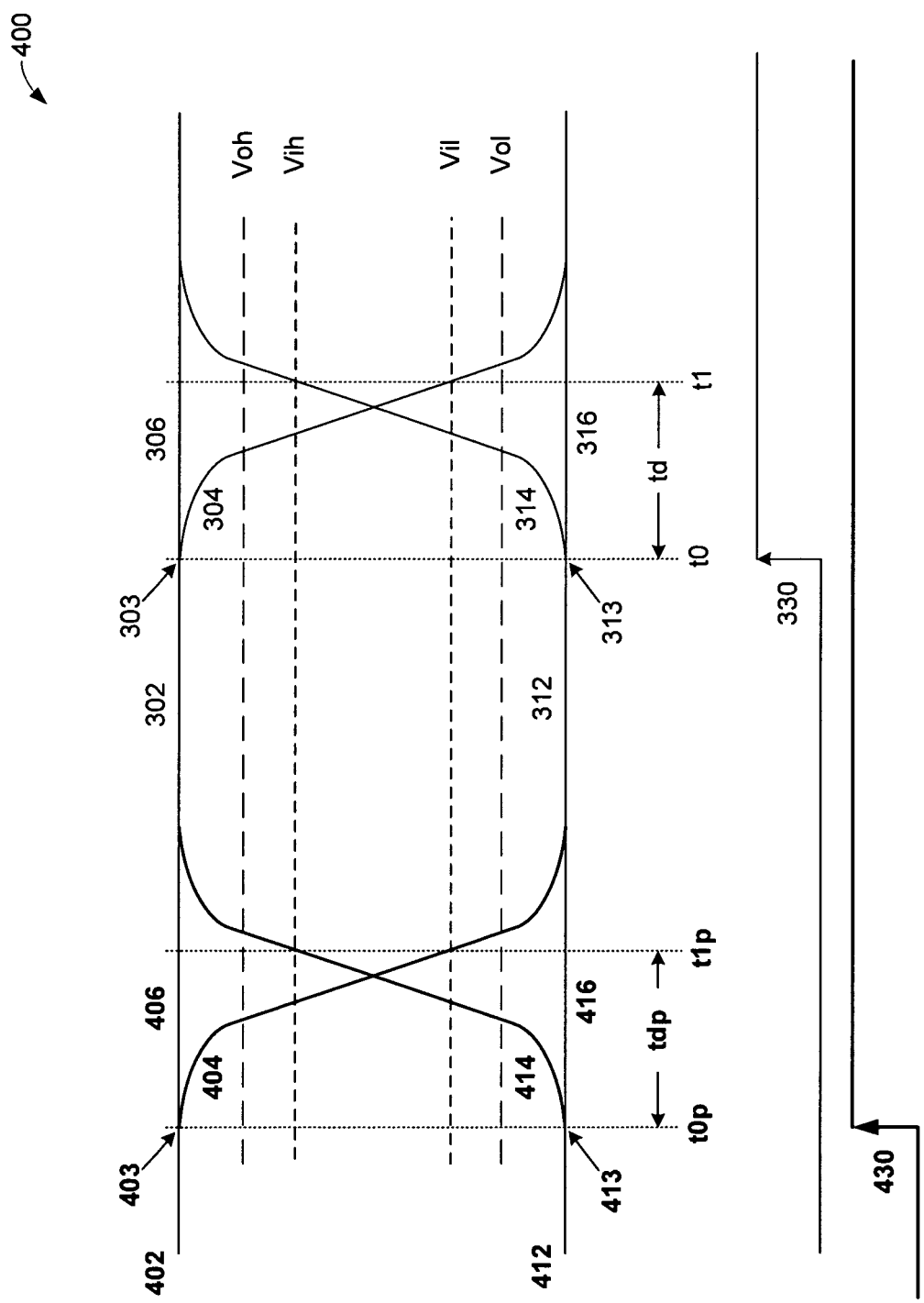
FIG. 4 illustrates one embodiment of the invention where the output begins switching (as denoted by heavier lines) well before the correct output state is determined.

FIG. 4 illustrates one embodiment of the invention 400 where the output begins switching (as denoted by heavier lines) well before the correct output state is determined at clock 330. For illustration sake we also show FIG. 3 notations and switching using finer lines. Here the predictive clock 430 is well ahead of the actual data clock 330 where we know what the outputs should be. As a result of the predictive clock 430 being well ahead of clock 330, the outputs (404, 406, 414, 416) have already switched and become stable before clock 330 comes along. The result is that the predictive clock has gained us nothing as the outputs still use a delay of td (from t0 to t1) to switch to the correct state.

Likewise, there is no gain if the predictive clock 430 arrives at the same time as clock 330 since clock 330 tells us what state the outputs should be in and the delay td is the switching delay.

As we "move" the predictive clock 430 closer to the clock 330, there is a region where the predictive approach provides a benefit in switching speed. This is possible because the output drive of a device is not linear and delays in the non-linear regions (i.e. near the logic high and logic low voltage rails) can be reduced by predictive switching.

Figure 5:
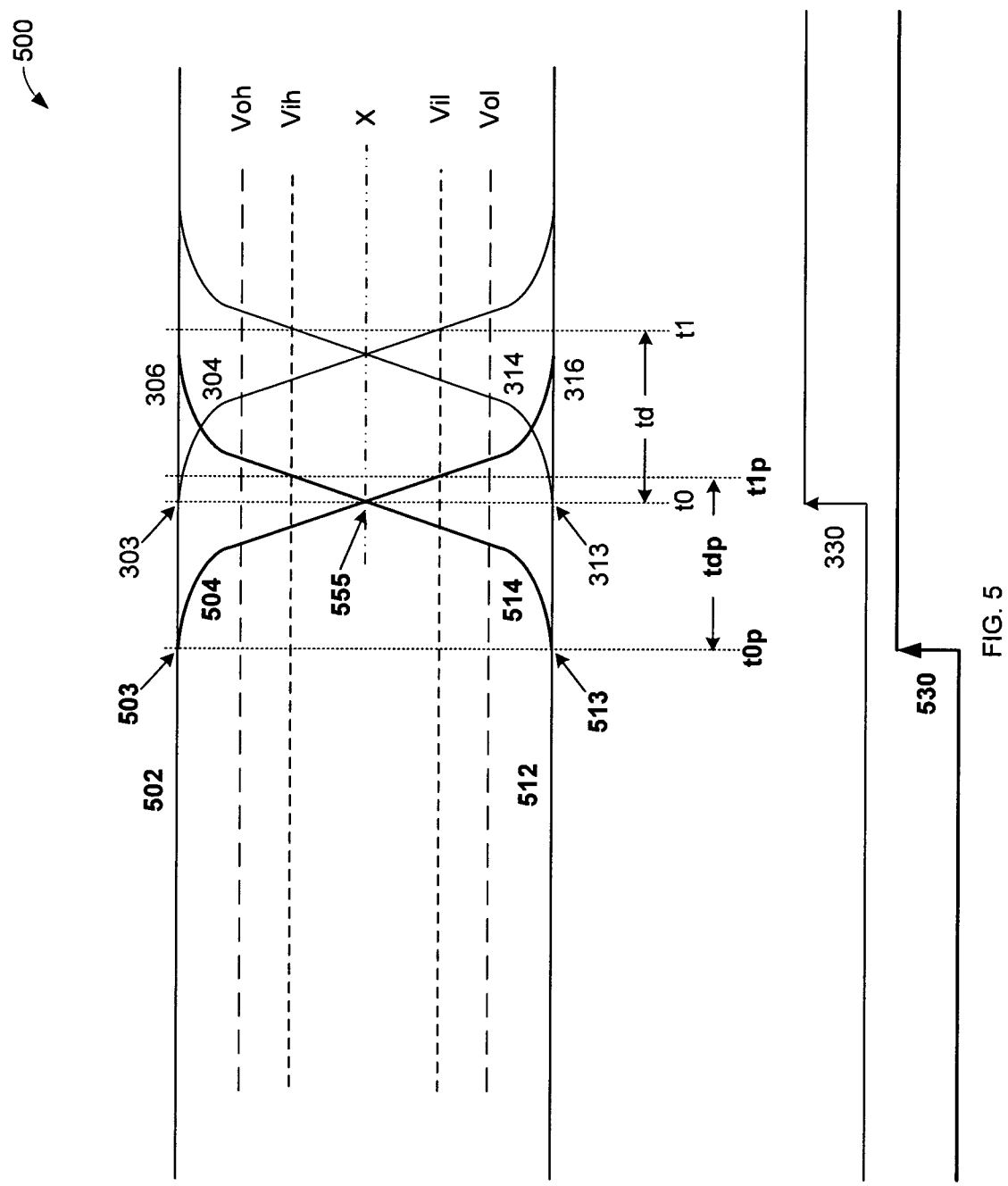
FIG. 5 illustrates one embodiment of the invention where the predictive clock is positioned so that the mid crossover point coincides with the actual data clock.

FIG. 5 illustrates one embodiment of the invention 500 where the predictive clock 530 is positioned so that the mid crossover point X at 555 coincides with the actual data clock 330. If the device is constructed so that at the clock 530 it starts to transition to the opposite state from what it was in (i.e. a prior output of low 512 now starts 513 going high 514, and a prior high output 502 now starts 503 going low 504) then at 330 the signals 504 and 514 are at the midpoint X 555. Clock 330 now indicates what the correct output states of the device should be. Assume for discussion that a prior high signal 502 at 503 starts going 504 low. At X 555 two possibilities exist, if the signal is to go low, then it can continue and once it reaches Vil (at t1p) the device receiving the output can start to switch. Thus the output switch time is from t0 to t1p, shorter than the original td time. If at X 555 the output is to stay high, then at X 555 it must "reverse" and rise to Vih. Assume for the sake of discussion that the "reversing" is instantaneous, in which case the output switching delay from clock 330 is t0 to t1p rather than td.

In like fashion a signal that is "pre-transitioning" from low to high, at 555 may continue to go high, or "reverse" and go low. In either case the delay is t0 to t1p which is shorter than td.

One of skill in the art will appreciate that by proper placement of the "predictive" clock in relation to the "actual" clock a faster output switching time is possible. Additionally, because the switching is predictive, in one embodiment of the invention, rather than speed up the switching time, the same approach may be used to switch in the same time as the non-predictive approach, however, since the signal has more time to reach a level, a less powerful driver output stage may be used.

Figure 6:
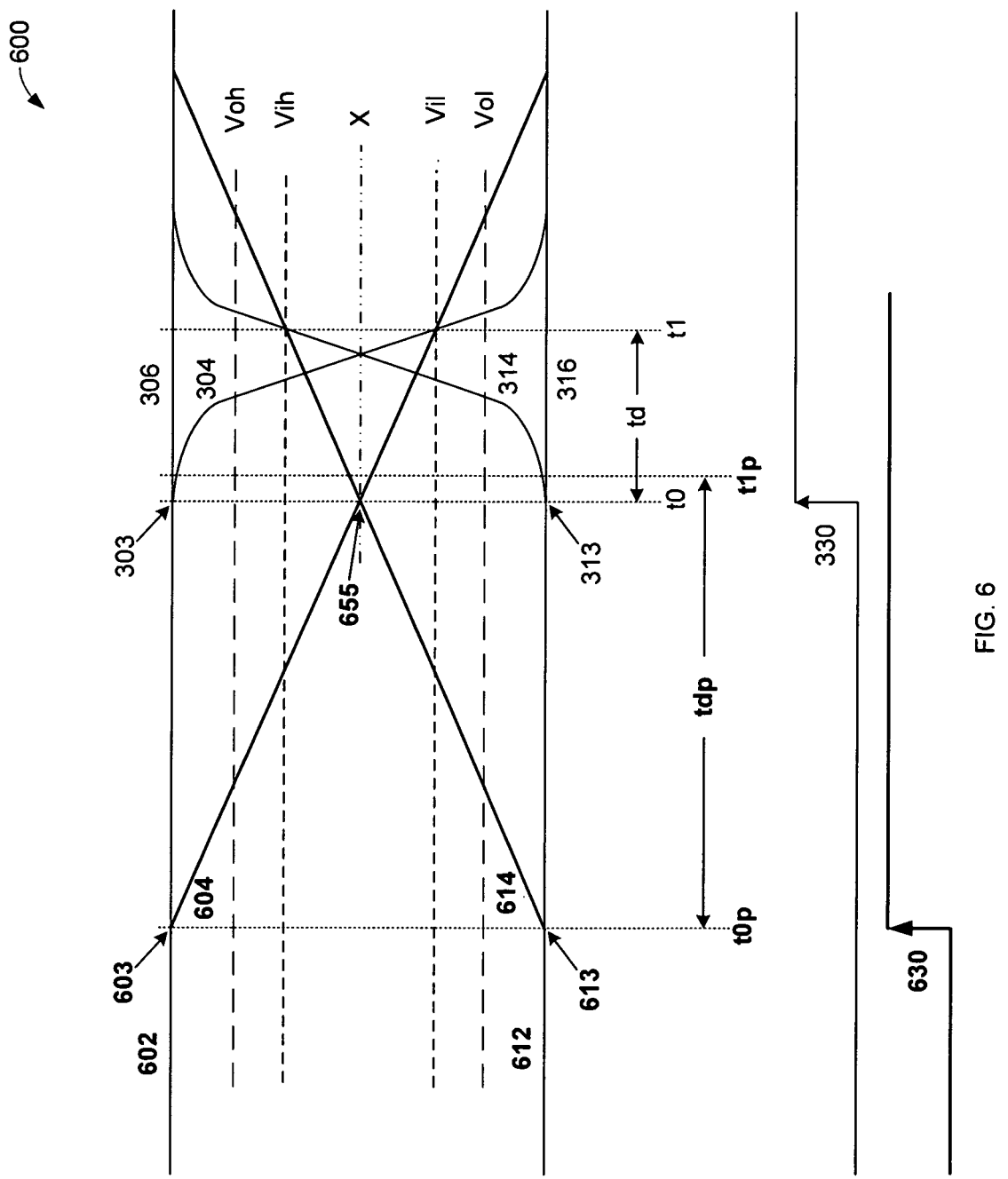
FIG. 6 illustrates one embodiment of the invention, where by using the predictive approach, the output transition time may be longer yet meet delay times.

FIG. 6 illustrates one embodiment of the invention 600, where by using the predictive approach, the output transition time may be longer yet the clock 330 to Vil or Voh is still td. This longer transition time may be possible by making the output drivers smaller and/or not driving them as hard. Here the clock 630 starts in advance of clock 330 and the rising 613, 614 and falling 603, 604 transitions are very gradual. 604 and 614 cross at 655 and they cross Vil and Vih respectively at t1 a delay of td from t0 meeting the original delay time. For illustration purposes the rise and fall time of 604 and 614 are shown as linear.

Figure 7:
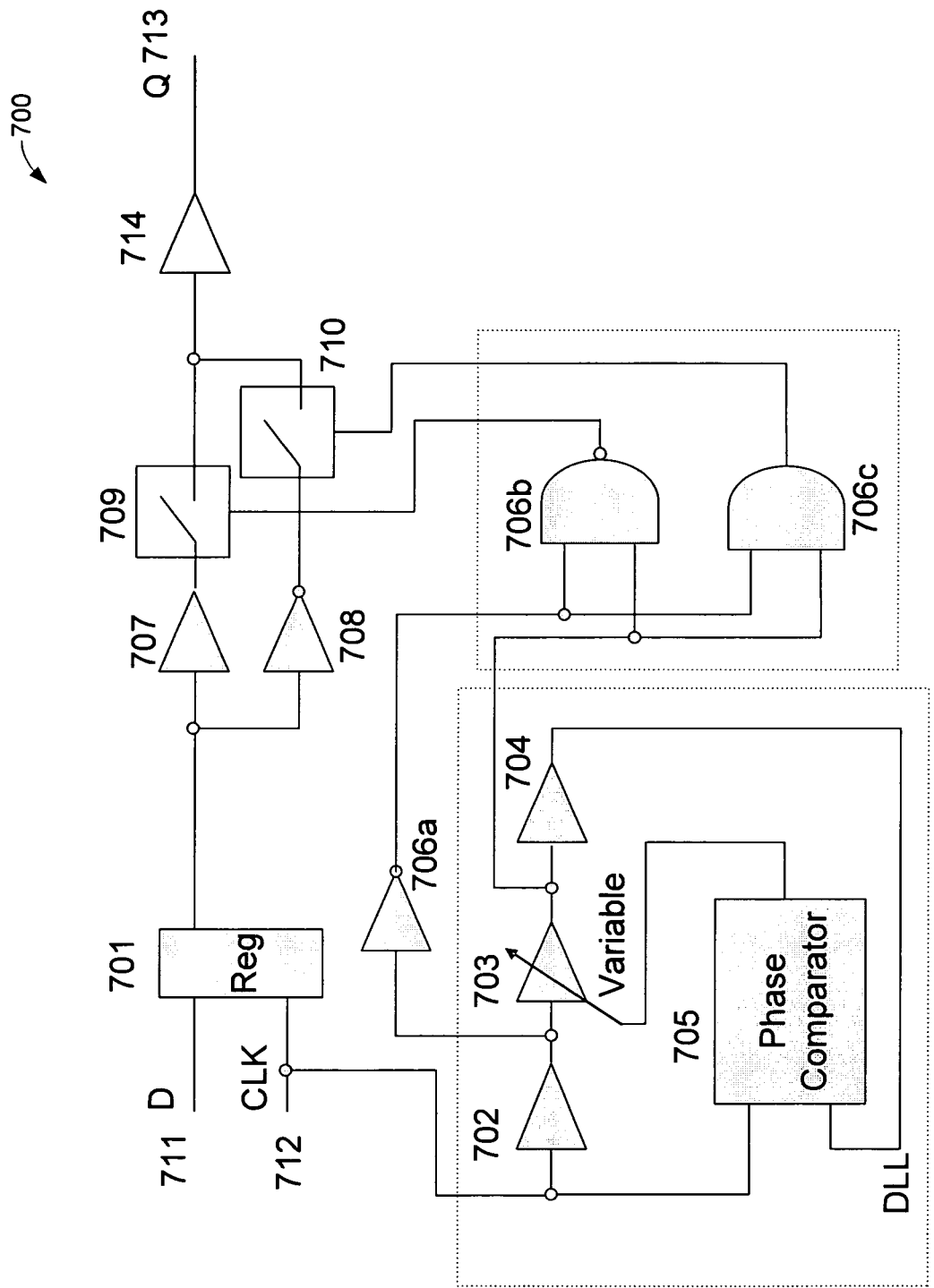
FIG. 7 illustrates one embodiment of the invention, showing how to generate a predictive clock and output switching.
Figure 8:
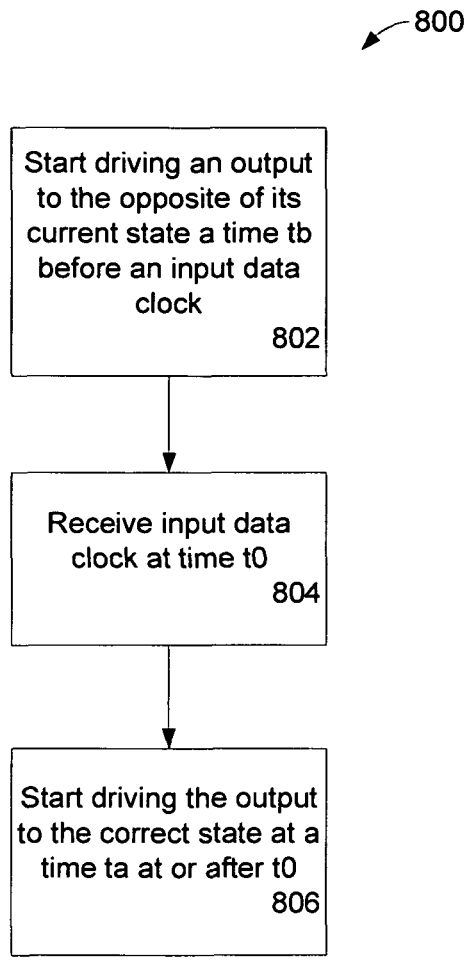
FIG. 8 illustrates a flow chart of one embodiment of the invention.

FIG. 7 illustrates one embodiment of the invention 700, showing how to generate a predictive clock and output switching in an application such as memory (DIMM DDR2—Dual In-line Memory Module Double Data Rate Two for example). Here the DIMM DDR2 type products use a register and a DLL (Delay Locked Loop). The principle of operation is that regardless of the desired output state in response to a certain input state, the register should switch its output in each clock cycle to the opposite state of the previous output state a certain time before the actual arrival of the clock edge. Thereafter there exist two different scenarios:

1. If the state has to change (i.e. input signal changes state compared to last clock cycle) then the output reaches final state some amount of time earlier than without the invention.
2. If the state does not need to change (i.e. input signal maintains the state of the last clock cycle) then the output has to switch back to its old state. This takes less time than a complete signal swing so that, also in this case, the final state is reached earlier.

Since most of the register delay comes from transition time, one of the ways to reduce this delay is to reduce the required swing while maintaining the slew rate. This may be done by "reverse" driving the output an amount of time before the start of the next cycle. This amount of time will be technology dependent. For example, this amount of time may be around 300 ps before the rising clock edge in DDR2 DIMM registers. Once the correct state for the output is determined, the device could finally drive towards the required direction. Depending on the technology used, this point in time may be around 200 ps after the rising clock edge in DDR2 DIMM registers. FIG. 7 illustrates one embodiment 700 of the invention, showing how to achieve this.

The input signal D 711 is latched into register Reg 701 on the rising edge of clock CLK 712. The output signal of register 701 goes to buffer 707 and inverter 708. Buffer 707 provides the required output signal to the output buffer 714 while the inverter 708 provides the signal to drive the output to the opposite direction. To create the right timing a delay locked loop (DLL composed of 702, 703, 704, and 705) is used. The total time through 702, 703 and 704 is tuned to be exactly one clock cycle by varying the delay in 703. The correct cycle time is determined by phase comparator 705. At the output of delay line 702 the input clock 712 is replicated with a delay, for example 200 ps. The output of delay line 704 is in phase with the clock signal 712, therefore the input of delay line 704 is early, for example 300 ps, relative to the input clock signal 712. The buffers 706b and 706c in combination with inverter 706a turn off switch 709 and turn on switch 710 as long as the signal on the input of 703 is low and the signal on the output of 703 is highs. This is the time period from, for example, 300 ps before input clock edge until, for example, 200 ps after input clock edge. During this period of time the circuit drives the output signal to the opposite of the previous output state via inverter 708. From a practical standpoint, it needs to be assured by design that buffer 707 output has stabilized before gates 706b and 706c switches the input of output driver 714 from inverter 708 to buffer 707.

As illustrated in FIG. 7 the output Q 713 starts out being driven in an opposite direction by 708 via switch 710, and then sometime later to the correct output state by 707 via switch 709.

One of skill in the art will appreciate that FIG. 7 illustrates but one possible embodiment of the invention. Additionally, one of skill in the art will appreciate that for a wider range of pre-switching it might be required to replace the logical gates 706b and 706c in FIG. 7 with, for example, two edge triggered latches, otherwise the range of pre-switching is limited to ½ (one half) clock cycle length in total.

FIG. 800 illustrates in flow chart form one embodiment 800 of the invention. At 802 an output is starting to be driven to a state opposite that which it was a time tb before an input data clock arrives. At 804 the input data clock is received at time t0. At 806 a time ta at or after t0 the output is driven to the correct state.

Thus a method and apparatus for predictive switching an output have been described.

Figure 1:
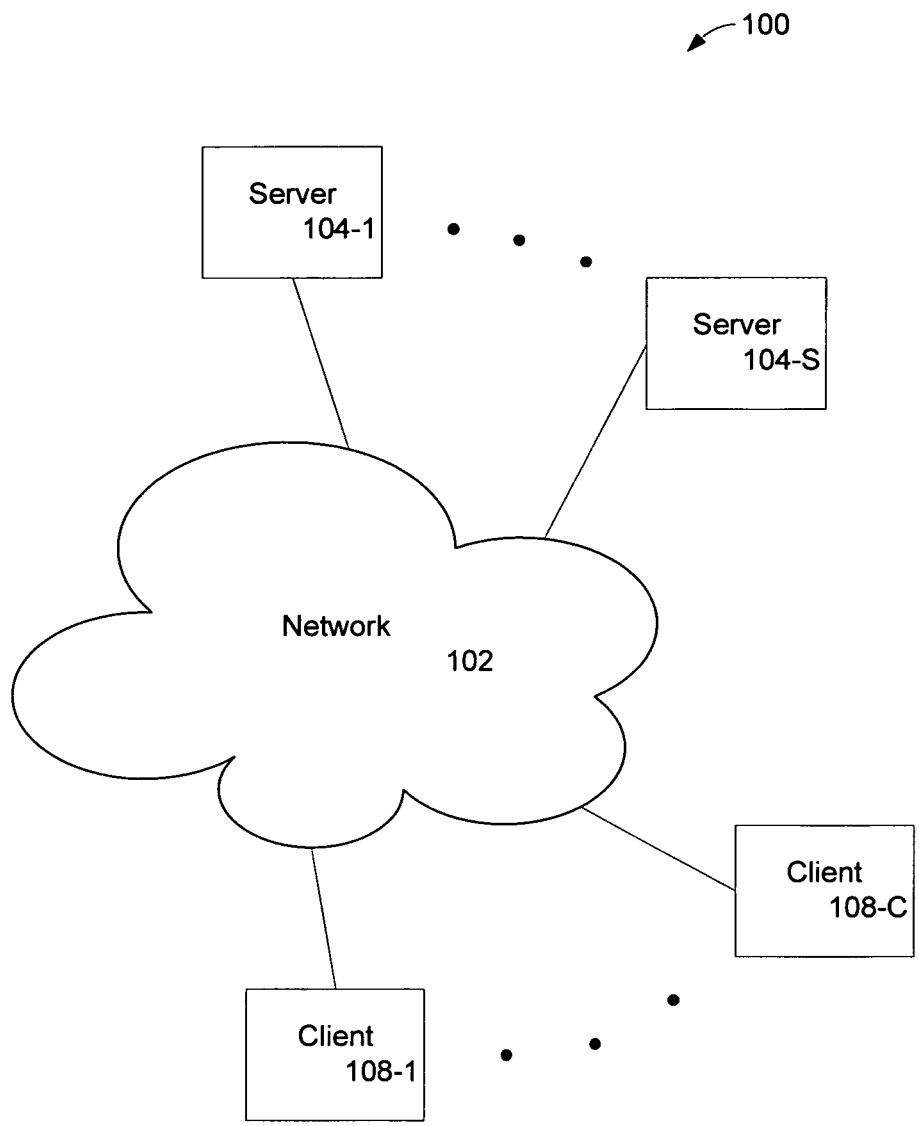
FIG. 1 illustrates a network environment in which the method and apparatus of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
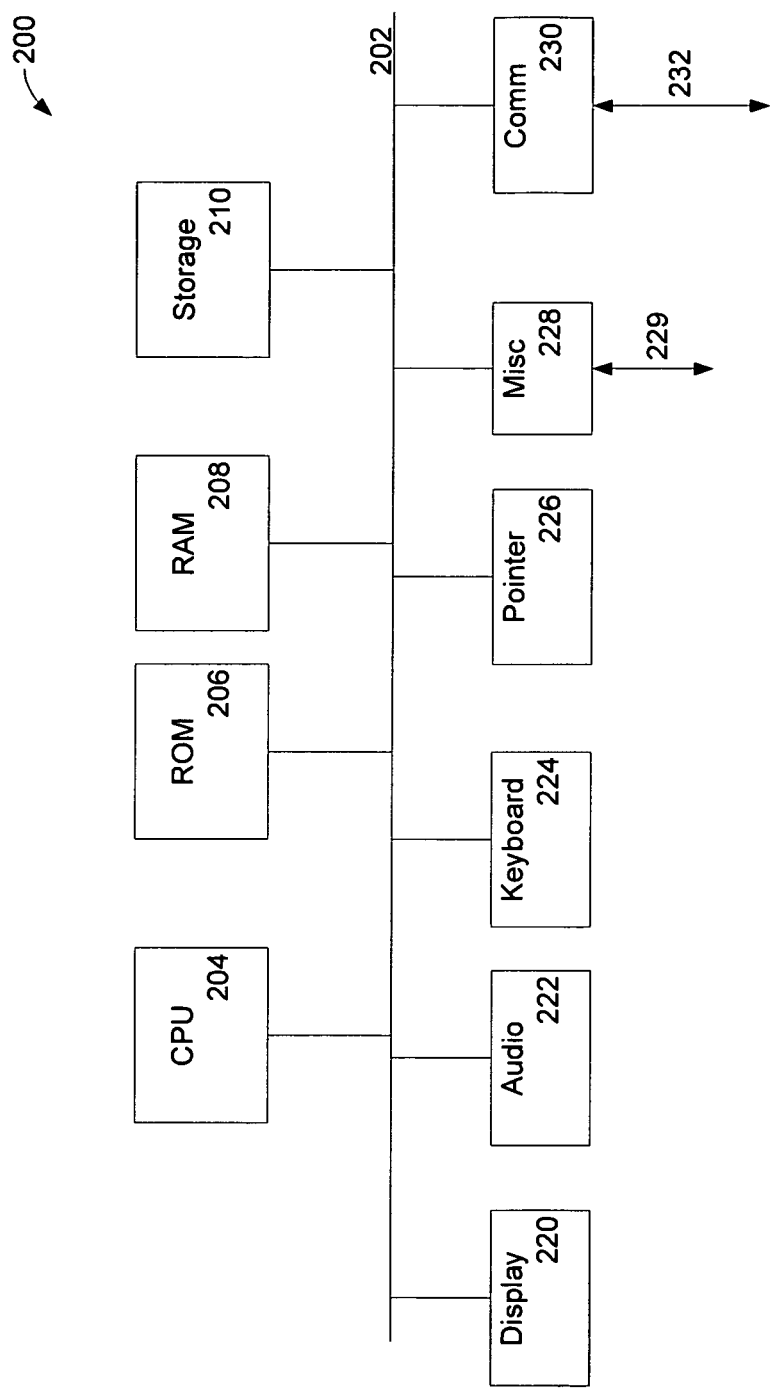
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. The Bus system 202, the Central Processing Unit (CPU) 204, the Read Only Memory (ROM) 206, the Random Access Memory (RAM) 208, and in fact all of the components and busses in FIG. 2 may make use of embodiments of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of skill in the data processing arts to most effectively convey the substance of their work to others of skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities.

Further, any of the methods according to the present invention can be implemented in hard-wired circuitry, by programmable logic, or by any combination of hardware and software.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for predictive switching an output have been described.

What is claimed is:
1. A circuit comprising:
an input register having an input register data input, an input register clock input, and an input register output;
a buffering logic block having a buffering logic block input, a buffering logic block non-inverted output, and a buffering logic block inverted output, said buffering logic block input in communication with said input register output;

a timing logic block having a timing logic block input and a timing logic block output, said timing logic block input in communication with said input register clock input;

a control logic block having a control logic block input and a control logic block output, said control logic block input in communication with said timing logic block output;

a switching logic block having a switching logic block first input, a switching logic block second input, a switching logic block output, and a switching logic block control input, said control logic block input in communication with said control logic block output, said switching logic block first input in communication with said buffering logic block non-inverted output, said switching logic block second input in communication with said buffering logic block inverted output, and said switching logic block output capable of communicating a signal.

2. The circuit of claim 1 wherein said timing logic block further comprises a timing logic block delay lock loop.

3. The circuit of claim 2 wherein said timing logic block delay lock loop has an adjustable delay.

4. The circuit of claim 3 wherein said adjustable delay comprises two adjustable delays.

5. The circuit of claim 4 wherein a first delay causes said control logic block to activate said switching logic block to select said buffering logic block inverted output.

6. The circuit of claim 4 wherein a second delay causes said control logic block to activate said switching logic block to select said buffering logic block non-inverted output.

7. The circuit of claim 1 wherein said timing logic block has a timing logic block second output, said control logic block has a control logic block second input, said control logic block has a control logic block second output, said switching logic block has a switching logic block second control input, and said control logic block second input is in communication with said timing logic block second output, and said switching logic block second control input is in communication with said control logic block second output.

* * * * *